United States Patent Office 3,510,616
Patented May 5, 1970

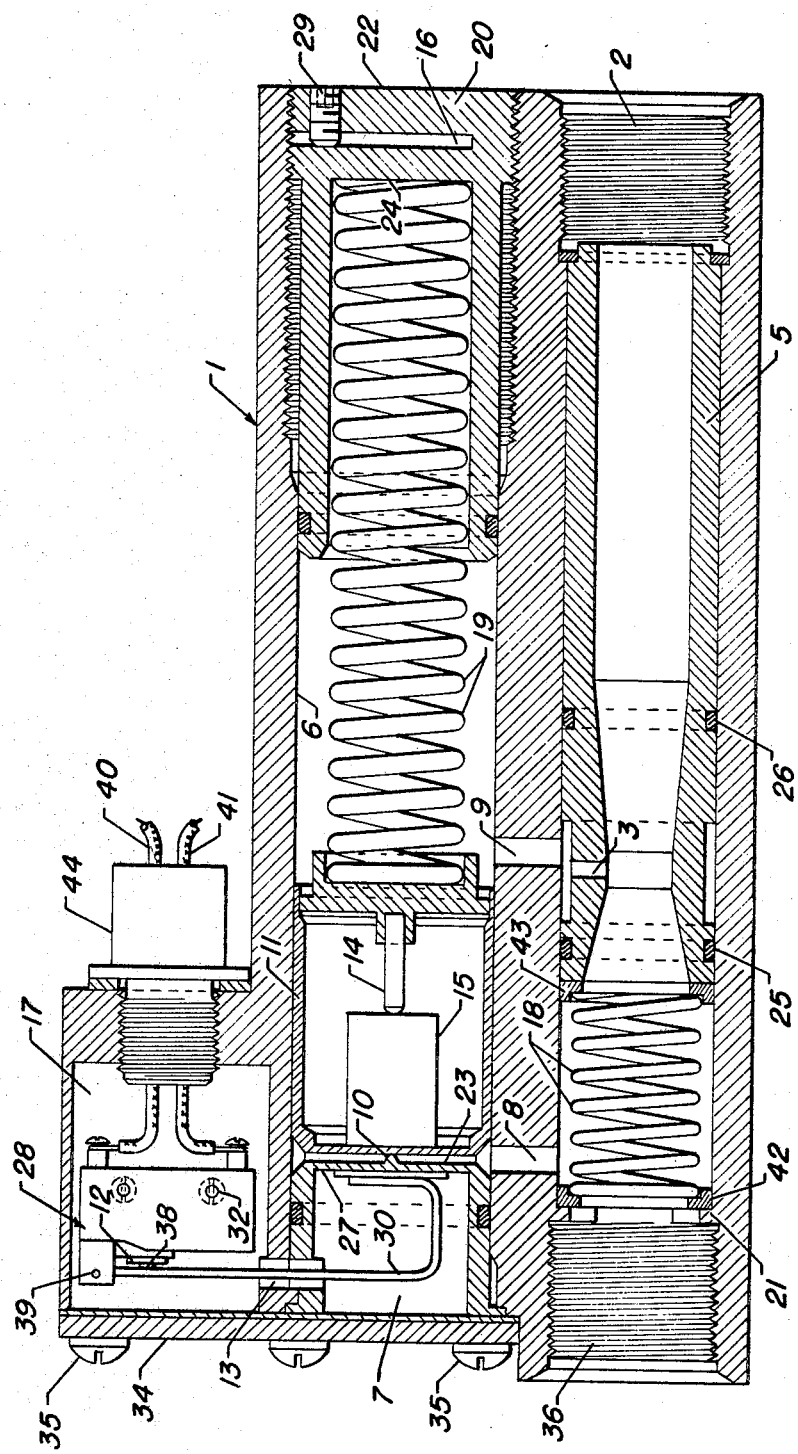

3,510,616
VENTURI OPERATED FLOW SWITCH
Emanuel J. Di Noia, Briar Cliff Manor, N.Y., and Theodore R. Breunich, Stamford, Conn., assignors to Universal Oil Products Company, Des Plaines, Ill., a corporation of Delaware
Filed Oct. 28, 1968, Ser. No. 771,247
Int. Cl. H01h 35/40
U.S. Cl. 200—81.9                  7 Claims

ABSTRACT OF THE DISCLOSURE

A flow switch operated by flow rate changes from a critical flow rate range. The pressure differential in a venturi tube is applied against the spring bias of a compression spring. This spring bias tends to push a piston against an end of a cylinder or cavity. When the flow rate increases sufficiently the venturi tube pressure differential increases beyond the limiting value necessary to overcome the spring bias of the compression spring and thereby forces the piston away from the cavity end. When the flow rate decreases sufficiently, the venturi tube pressure differential falls below that necessary to overcome the spring bias of the compression spring and the piston returns to the cavity end. The piston contains a magnet which when near the cavity end magnetically attracts through the cavity end piece, a contact arm positioned exteriorly from the cavity. As the magnetic field of the magnet overcomes the bias of the contact arm away from the end piece, the contact arm moves toward the magnet and closes the contacts of an electric circuit.

---

The present invention relates to a flow switch operated by changes in pressure differential in a venturi tube. Changes in the switch condition occur whenever the flow rate through the venturi tube increases or decreases through a critical predetermined flow rate range. More particularly, pressure differential in a venturi tube is applied against the spring bias of a compression spring. This spring bias tends to push a piston against an end of a cylinder or cavity. When the flow rate increases sufficiently the venturi tube pressure differential increases beyond the limiting value necessary to overcome the spring bias of the compression spring and thereby forces the piston away from the cavity end. When the flow rate decreases sufficiently, the venturi tube pressure differential falls below that necessary to overcome the spring bias of the compression spring and the piston returns to the cavity end. The piston contains a magnet which when near the cavity end magnetically attracts, through the cavity end, a contact arm positioned exteriorly from the cavity. As the magnetic field of the magnet overcomes the bias of the contact arm away from the end piece, the contact arm moves toward the magnet and closes the contacts of an electric circuit.

There are currently many forms of flow switches utilized to open and close electric contacts when a flow rate exceeds or decreases to critical flow rates. The conventional switches used for this purpose inevitably encounter some or all of the problems of inaccuracy, unreliability, excessive weight, and the danger of causing an explosion.

It is therefore an object of this invention to provide a flow switch which is extremely and consistently accurate in operating at predetermined critical flow rates. This accuracy is possible because pressure differential across a venturi tube is quite consistent for a certain flow rate of a given fluid. In addition, the pressure differential resulting is particularly stable in an incompressible fluid.

Another object of this invention is to provide a flow switch which is exceedingly reliable in operation. Reliability is a predominant feature of the present flow switch because of the minimal number of moving parts involved and because none of the moving parts are located directly in the fluid flow stream operating the switch.

A further object is to reduce the possibility of an explosion of a combustible fluid caused by the electric circuit in the switch. The switch, as preferably designed, is isolated completely from the fluid medium used. For this reason, danger of ignition of a combustible fluid by heating or by sparking of the electric contacts is virtually non-existent In addition, the preferred embodiment of this flow switch is obtainable in a unitized, sturdy, light-weight, compact form to alleviate any problems of space or weight. Because of the various features of this invention, it is particularly useful in activating an alarm or automatic correction mechanism in regulating fuel flow in aircraft and other vehicles. This is by no means the only use, however, as this flow switch has numerous other applications.

In one aspect, this invention is a flow switch comprising in combination: a venturi tube having a first opening through the wall of said venturi tube near an end of said venturi tube and a second opening through the wall of said venturi tube at the throat of said venturi tube; a hollow cylinder closed at both ends and having a first opening through the cylinder wall near a first end of said cylinder, and a second opening through the cylinder wall nearer the second end of said cylinder; a first pressure transmission tube connecting said first opening through the wall of said venturi tube with the first opening through the wall of said cylinder, and a second pressure transmission tube connecting said second opening through the wall of said venturi tube with the second opening through the wall of said cylinder; a piston carrying a magnet and slidably positioned between said first and second openings through the cylinder wall; a spring support at said second cylinder end; a compression spring positioned between said piston and said spring support and biasing said piston towards said first cylinder end; and an electric switch proximately positioned with respect to said cylinder and having a stationary electric contact, a magnetically attractable contact arm pivotally attached to said switch and extending adjacent to and biased with respect to said first cylinder end, and a movable electric contact carried by said contact arm and closeable with respect to said stationary contact. One form of the invention which is constructed in conformance with these terms involves construction of the elements of the invention as several interconnected units. Such a construction probably, but not necessarily, would envision extreme temperature or other unusual operating conditions of the flowing fluid, thereby making advantageous the relatively distant location of the venturi from the other parts of the invention In its preferred embodiment, however, this invention is a flow switch comprising in combination; a housing having a venturi cavity therethrough, a piston cavity having first and second ends, a first pressure transmission channel connected to said venturi cavity near an end of said venturi tube cavity and to said piston cavity near said first piston cavity end, a second pressure transmission channel connected to said venturi cavity and to said piston cavity nearer said second piston cavity end than is said first pressure transmission channel, a contact arm cavity separated from said first piston cavity end by a partition, and a switch cavity in communication with said contact arm cavity; a venturi tube positioned in said venturi tube cavity and longitudinally displaced from the connection of said first pressure transmission channel to the aforesaid end of said venturi tube cavity, and having an opening in the wall of said venturi tube connecting the venturi tube throat to said second pressure transmission channel; a piston carrying a magnet and slideably positioned between the connections of said first and second pressure transmission channels to said piston cavity; a spring support at said second piston cavity end; a compression spring positioned between said piston and said spring support and biasing said piston toward said first piston cavity end; and an electric switch mounted in said switch cavity and having a stationary electric contact, a magnetically attractable contact arm pivotally mounted with respect to said switch and extending into said contact arm cavity and biased with respect to the aforesaid partition, and a movable electric contact carried by said contact arm and closeable with respect to said stationary contact. This embodiment is normally preferable to others because all parts of the flow switch are provided in a unitized apparatus. The housing in this embodiment provides protection of all the elements of this invention from sources of potential damage in the normal environment of the flow switch.

There are several further desirable features which may be incorporated into the preferred embodiment of this invention. One such modification exists where the spring support and the second piston cavity end are engageably threaded, whereby the spring support is longitudinally adjustable in the piston cavity. In this manner, the necessary pressure differential required to force the piston and a magnet contained therein beyond the effective reach of the magnetic field of the magnet may be adjusted to the particular fluid medium, magnet strength, spring strength, and other individual variations in each flow switch.

Another desirable modification of this invention utilizes a partition which has a protuberance extending toward the piston cavity, whereby the piston is prevented from contacting the face of the partition. In any embodiment of this invention, the flow switch will function as long as the piston wall does not block the entire opening of the first pressure transmission channel into the piston cavity. However, more instantaneous response to pressure changes at extremely low flow rates may be gained by maintaining a minimum distance between the piston head and the face of the partition, such as by using a protuberance as described. The maintenance of this minimum distance insures that any changes in pressure across the venturi tube will act immediately upon the entire face of the piston head.

During operation of the preferred form of the flow switch, a flow through the venturi results in a pressure difference between the two pressure measurement openings in the venturi, one being at either end of the venturi tube and the other being at the venturi tube throat. This pressure differential varies with flow rate and the flow switch must be constructed to operate at the pressure that corresponds to the desired critical flow rate range. The pressure differential is developed across the piston which is initially held against the partition by a pre-loaded spring. When the piston is held against the partition, the magnet attracts the contact arm which in turn actuates the switch, that is, holds the contacts of the switch open or closed.

The preload of the spring is adjusted to a force that is just overcome by the force on the piston caused by the pressure differential at the upper end of the critical flow rate range. As the flow and the resulting pressure differential increase further, the resulting imbalance of forces causes the piston and magnet to move increasingly far from the contact arm of the electric switch. As the magnet moves away from the contact arm, the magnetic force between the two decreases to the point that the force on the contact arm is not strong enough to keep the switch actuated, so the switch deactuates. This deactuation occurs at the upper limit of the critical flow rate range. With a further increase in flow, the switch remains deactuated. Conversely, as the flow decreases to a value below the switch actuation flow rate, the pressure force on the piston is less than the spring biasing force so that the piston and magnet return to their natural position. In this position, the magnet attracts the contact arm which in turn reactuates the switch. It should be noted that the piston must return further than the position at which the magnet released the contact arm in order for the contact arm to again be sufficiently magnetically attracted by the magnet. This is because the contact arm is more distant from the magnet in the deactuated position than in the actuated position. Thus, the flow rate must decrease to the lower limit of the critical flow rate range in order for the magnetic influence to be sufficient to reactuate the switch. The force of the magnet as well as the force required to operate the switch will vary slightly with each unit. These forces are small as compared to the spring force or pressure differential force and are easily compensated for by adjusting the unit under actual flow conditions. A preferred construction of the piston and magnet assembly results in several desirable features. By enclosing the magnet in the piston, the magnet is protected from the operating medium. As a hollow sealed unit, the piston and magnet can be constructed to displace a volume of liquid of approximately equal weight. When the piston is made to just float, the entire unit can be made insensitive to position. Even when the piston and enclosed magnet are not designed to displace an equal volume of fluid, the variations in force required to compress the compression spring are negligible for most fluids and flow rates. Throughout the flow switch, all metal parts in contact with the operating medium are noncorrodible, normally stainless steel.

The flow switch can be constructed with greater ease of manufacture and to cover a wider range of critical flow rates if the venturi tube is removably positioned in the venturi tube cavity and rigidly held in position by restraining means. Thus, several different venturi inserts having different inside dimensions may be used interchangeably, depending upon the critical flow rates and the fluid used. For similar reasons, the flow switch can be designed so that the compression spring is also a removable and interchangeable element. As an insert, the venturi is held in place by retaining rings and a compression spring. Once the switch is properly mounted, this retaining means is unimportant to the operation of the unit.

The various features of this invention are further illustrated in the accompanying drawing, which is a sectional view of the preferred embodiment of this invention.

Referring now to the drawing, there is illustrated a housing 1 having a venturi cavity 2, a piston cavity 6, a contact arm 7, and a switch cavity 17. A portion of the housing 1 is open at one end, thereby exposing switch cavity 17 and contact arm cavity 7 in order to facilitate construction and maintenance of the flow switch. This open portion of housing 1 is covered by a cover plate 34 secured to housing 1 by machine screws 35. Cover plate 34 forms a tight seal with housing 1, thereby isolating switch cavity 17 and contact arm cavity 7. Within housing 1, piston cavity 6 has a first end 23 and a second end 24. Also within housing 1, a first pressure transmission channel 8 is connected to venturi cavity 2 near an end of venturi cavity 2 and to piston cavity 6 near first piston cavity end 23. A second pressure transmission channel 9 is connected to venturi cavity 2 and piston cavity 6 nearer second piston cavity end 24 than is first pressure transmission channel 8. A partition 27 separates the piston cavity end 23 from contact arm cavity 7 within housing 1. Partition 27 has a protuberance 10 extending toward end 24 of piston cavity 6, thereby preventing the piston 11 from contacting the face of partition 27.

Within venturi cavity 2 of housing 1, a venturi tube 5 is positioned and is longitudinally displaced from the connection of first pressure transmission channel 8 to the aforesaid end of the venturi cavity. In the illustrated embodiment, first pressure transmission channel 8 is connected to venturi cavity 2 upstream from the inlet of venturi tube 5, though it could have been connected to venturi cavity 2 downstream from the outlet of venturi tube 5. The outlet end of venturi tube 5 is held in place in venturi tube cavity 2 by a collar around the outside perimeter of venturi tube 5 and an accommodating ledge of housing 1 indented into the venturi tube cavity 2. The inlet end of venturi tube 5 is secured in place at end 36 of venturi tube cavity 2 by a retaining means comprised of retaining rings 42 and 43, between which is positioned a compression spring 18. Venturi tube 5 may be inserted in venturi cavity 2 of housing 1 through end 36 of venturi cavity 2 in housing 1. Venturi tube 5 is then pushed to the opposite end of venturi cavity 2 until the collar around the periphery of venturi tube 5 at the venturi tube outlet seats against the ledge of housing 1 indented into venturi cavity 2. Retaining ring 43 is then tilted at an angle and inserted through end 36 of venturi cavity 2 and aligned adjacent to the venturi tube inlet. Compression spring 18 is then inserted and is compressed past retaining ledges 21 to an extent to allow retaining ring 42 to be tilted and inserted through end 36 of the venturi cavity and positioned between compression spring 18 and retaining ledges 21, which extend part way around the perimeter of venturi cavity 2. Retaining ring 42 is then positioned adjacent to and seated against retaining ledges 21 and compression spring 18 is allowed to expand thereby holding retaining rings 42 and 43 and venturi tube 5 rigidly in place. A reverse procedure is followed to extract venturi tube 5 from venturi cavity 2.

There is an opening 3 through the wall of venturi tube 5 at the venturi tube throat. This opening connects the venturi tube throat to second pressure transmission channel 9. Positioned about the outer periphery of the venturi tube 5 between the venturi throat and the venturi inlet and are O-rings 25. O-rings 26 are positioned about the outer periphery of venturi tube 5 between the venturi tube throat and the venturi tube outlet. O-rings 25 and 26 insure that no liquid enters second pressure transmission channel 9 from any source other than opening 3 in venturi tube 5.

A hollow piston 11 is positioned within the piston cavity 6 and encloses a magnet 15 held against the piston head wall by a retaining pin 14. Piston 11 is positionable between the connections of first pressure transmission channel 8 and second pressure transmission channel 9 to piston cavity 6. A spring support 20 is mounted at end 24 of piston cavity 6 in housing 1. Spring support 20 is removably and engageably threaded with housing 1 at piston cavity end 24, whereby compression spring 19 can be replaced and support 20 is longitudinally adjustable in piston cavity 6. In addition, spring support 20 is provided with a set screw 29 which extends longitudinally into spring support 20 near an edge of the exterior surface 22 of spring support 20. Spring support 20 is also provided with a disc shaped gap 16, extending transversely through the greater portion of spring support 20, whereby exterior surface 22 is connected to the remainder of spring support 20 by a neck and thus extends transversely in a cantilever fashion. Set screw 29 is located some distance from the connecting neck and encounters an edge of gap 16. When tightened, set screw 29 distorts the thread portions of the cantilevered portion of spring support 20. The threads of these portions are thereby locked to the engageable mating threads of housing 1.

A compression spring 19 is positioned between piston 11 and spring support 20 in piston cavity 6 of housing 1. Compression spring 19 biases piston 11 toward end 23 of piston cavity 6 and is seated at each end in appropriate recesses of piston 11 and spring support 20.

An electric switch 28 is mounted in switch cavity 17 and is secured to housing 1 by screws 32 which extend from the side of housing 1 not visible in the drawing into the switch 28. Switch 28 has a stationary electric contact 12, a magnetically attractable contact arm 30 pivotally mounted with respect to switch 28 by pivot pin 39 extending through switch 28. Contact arm 30 is spring biased away from partition 27. The extent of this biasing is limited by stopping ledge 13 of housing 1. Contact arm 30 carries a movable electric contact 38, which is closeable with respect to the stationary contact 12. An electric lead 40 is connected to contact arm 30 and an electric lead 41 is connected to stationary contact 12. Electric contacts 40 and 41 pass through and are sealed to the inner walls of a passageway through an annular threaded plug 44, which fits into an opening in housing 1. Switch 28, including contact arm 30, is thereby entirely isolated from the exterior of the flow switch within switch cavity 17 and contact arm cavity 7 within housing 1. An electric current passes from electric lead 40 through contact arm 30 and movable contact 38, through stationary contact 12, and back to electric lead 41 when the switch is closed.

In the operation of this invention, a liquid flows through venturi tube 5. While the liquid flow continues in venturi tube 5, the pressure will always be greater at the venturi inlet than at the throat, therefore the pressure transmitted by the liquid from the venturi cavity 2 through first pressure transmitting channel 8 will always be greater than pressure transmitted by second pressure transmitting channel 9. The liquid then exerts a pressure on piston 11 in the space at piston cavity end 23 equal to the pressure differential between the pressure at first pressure transmitting channel 8 and that at second pressure transmitting channel 9. As the flow rate increases, the resultant force acting on piston 11 tends to overcome the force exerted on piston 11 toward piston cavity end 23 by compression spring 19 and piston 11 moves toward end 24 of piston cavity 6 carrying with it magnet 15. The magnetic field through partition 27 then decreases until the magnetic force exerted by magnet 15 is no longer great enough to overcome the spring bias of contact arm 30. Contact arm 30 then springs away from partition 27 until it is halted by stopping ledge 13 of housing 1. In this movement, contact arm 30 carries with it movable contact 38, which separates from stationary contact 12. The separation of contacts breaks the electrical circuit passing through the movable contact 38 and stationary contact 12 as connected by electric leads 40 and 41. Any further increase in flow rate through venturi tube 5 will produce no change in the electrical condition of this circuit.

If the flow rate through venturi tube 5 decreases, the pressure differential between the pressure at first pressure transmitting channel 8 and second pressure transmitting channel 9 decreases until the force of compression spring 19 is sufficient to overcome the force exerted on the face of piston 11 toward end 24 by the liquid. As compression spring 19 face of piston 11 toward end 23 of piston cavity 6, contact arm 30 comes within the influence of the magnetic field exerted by magnet 15. Magnet 15 draws contact arm 30 up against partition 27, thereby resulting in the closure of movable contact 38 with stationary contact 12. A further decrease in flow rate through venturi tube 5 will produce no change in the electrical condition of the switch circuit.

In a decreasing flow rate, the flow rate through venturi tube 5 which will allow the switch contacts to close will be somewhat less than the flow rate which will cause the switch contacts to open in an increasing flow rate. This is because that for a given longitudinal position of magnet 15, contact arm 30 is initially closer to magnet 15, and thus more strongly magnetically attracted, when the flow rate increases to the critical range than it is when the flow rate decreases to the critical range. This variation can be increased or reduced as desired by varying the position of stopping ledge 13 of housing 1, which determines how far contact arm 30 is allowed to spring away from partition 27 when the spring biasing of contact arm 30 overcomes the magnetic influence of magnet 15. It is impossible to eliminate this variation completely, however.

Although the preferred embodiment, as depicted in the drawing, causes the switch to open when the flow rate increases sufficiently and to close when the flow rate decreases sufficiently, the opposite result is equally obtainable. By merely altering the construction or the positions of the electric contacts, the switch can be made to close upon a sufficient increase in flow rate and open when the flow rate is sufficiently decreased.

Also, in the preferred embodiment, the first pressure transmitting channel 8 connects the inlet of the venturi tube to the end 23 of piston cavity 6. In another embodimet, the venturi tube could be inserted or integrally constructed in the reverse direction so that the outlet of the venturi tube is connected to the first pressure transmitting channel which in turn is connected to the end of the piston cavity adjacent to the partition. This is possible since the pressures at both the venturi inlet and the venturi outlet are greater than the pressure at the venturi throat.

An alternative embodiment to the venturi insert in which the first pressure transmitting channel is connected only to the venturi cavity at the venturi inlet, is an embodiment identical to that illustrated in the drawing with the exception that this alternative embodiment utilizes a venturi tube having a first opening in the wall of the venturi tube connecting a venturi tube end to the first pressure transmission channel and a second opening in the wall of the venturi tube connecting the venturi tube throat to the second pressure transmission channel. Since this construction requires an additional machining step in the manufacture of the venturi tube it is normally not the preferred embodiment, but nevertheless falls within the scope of this invention.

While the embodiment of the flow switch illustrated in the drawing is contained in a single unit, a single enveloping unit is not essential to the concept of this invention. An embodiment wherein the elements of the flow switch are constructed of several interconnected parts is equally within the inventive concept as has been previously described herein.

The foregoing detailed description of the preferred embodiment and the descriptions of some of the possible modifications of this invention have been given for clearness of understanding only, and no unnecessary limitations should be construed therefrom as other modifications will be obvious to those skilled in the art.

We claim as our invention:

1. A flow switch comprising in combination:
   (a) a housing having a venturi cavity extending therethrough, a piston cavity having first and second ends, a first pressure transmission channel connected to said venturi cavity near an end of said venturi tube cavity and to said piston cavity near said first piston cavity end, a second pressure transmission channel connected to said venturi cavity and to said piston cavity nearer said second piston cavity end than is said first pressure transmission channel, a contact arm cavity separated from said first piston cavity end by a partition, and a switch cavity in communication with said contact arm cavity.
   (b) a venturi tube positioned in said venturi tube cavity and longitudinally displaced from the connection of said first pressure transmission channel to the aforesaid end of said venturi tube cavity, and having an opening in the wall of said venturi tube connecting the venturi tube throat to said second pressure transmission channel,
   (c) a piston carrying a magnet and slideably positionable between the connections of said first and second pressure transmission channels to said piston cavity,
   (d) a spring support at said second piston cavity end,
   (e) a compression spring positioned between said piston and said spring support and biasing said piston toward said first piston cavity end, and
   (f) an electric switch mounted in said switch cavity and having a stationary electric contact, a magnetically attractable contact arm pivotally mounted with respect to said switch and extending into said contact arm cavity and biased with respect to the aforesaid partition, and a movable electric contact carried by said contact arm and closeable with respect to said stationary contact.

2. The flow switch of claim 1 further characterized in that said spring support and said second piston cavity end are engageably threaded whereby said spring support is longitudinally adjustable in said piston cavity.

3. The flow switch of claim 1 further characterized in that said partition has a protuberance extending toward said piston cavity, whereby said piston is prevented from contacting the face of said partition.

4. The flow switch of claim 1 further characterized in that said venturi tube is removably positioned in said venturi tube cavity and is rigidly held in position by restraining means.

5. The flow switch of claim 1 further characterized in that said piston is hollow and encloses said magnet.

6. A flow switch comprising in combination:
   (a) a housing having a venturi cavity extending therethrough, a piston cavity having first and second ends, a first pressure transmission channel connected to said venturi cavity and to said piston cavity near said first piston cavity end, a second pressure transmission channel connected to said venturi cavity and to said piston cavity nearer said second piston cavity end than is said first pressure tarnsmission channel, a contact arm cavity separated from said first piston cavity end by a partition, and a switch cavity in communication with said contact arm cavity,
   (b) a venturi tube positioned in said venturi tube cavity and having a first opening in the wall of said venturi tube connecting a venturi tube end to said first pressure transmission channel and a second opening in the wall of said venturi tube connecting the venturi tube throat to said second pressure transmission channel,
   (c) a piston carrying a magnet and slideably positionable between the connections of said first and second pressure transmission channels to said piston cavity,
   (d) a spring support at said second piston cavity end,
   (e) a compression spring positioned between said piston and said spring support and biasing said piston toward said first piston cavity end, and
   (f) an electric switch mounted in said switch cavity and having a stationary electric contact, a magnetically attractable contact arm pivotally mounted with respect to said switch and extending into said contact arm cavity and biased with respect to the aforesaid partition, and a movable electric contact carried by said contact arm and closeable with respect to said stationary contact.

7. A flow switch comprising in combination:
   (a) a venturi tube having a first opening through the wall of said venturi tube near an end of said venturi tube and a second opening through the wall of said venturi tube at the throat of said venturi tube,
   (b) a hollow cylinder closed at both ends and having a first opening through the cylinder wall near a first end of said cylinder, and a second opening through the cylinder wall nearer the second end of said cylinder,
   (c) a first pressure transmission tube connecting said first opening through the wall of said venturi tube with the first opening through the wall of said cylinder, and a second pressure transmission tube connecting said second opening through the wall of said venturi tube with the second opening through the wall of said cylinder,
(d) a piston carrying a magnet and slidably positioned between said first and second openings through the cylinder wall,
(e) a spring support at said second cylinder end,
(f) a compression spring positioned between said piston and said spring support and biasing said piston toward said first cylinder end, and
(g) an electric switch proximately positioned with respect to said cylinder and having a stationary electric contact, a magnetically attractable contact arm pivotally attached to said switch and extending adjacent to and biased with respect to said first cylinder end, and a movable electric contact carried by said contact arm and closeable with respect to said stationary contact.

References Cited

UNITED STATES PATENTS

| | | |
|---|---|---|
| 2,203,331 | 6/1940 | Hinsch. |
| 2,310,504 | 2/1943 | Aubert. |
| 2,444,163 | 6/1948 | Kocmich. |
| 2,628,296 | 2/1953 | Dillman. |
| 2,869,475 | 1/1959 | Bobo. |
| 2,887,546 | 5/1959 | Hatfield et al. |
| 3,113,189 | 12/1963 | Porwancher. |
| 3,325,612 | 6/1967 | Petersen et al. |

ROBERT K. SCHAEFER, Primary Examiner

J. R. SCOTT, Assistant Examiner

U.S. Cl. X.R.

200—83